United States Patent [19]

Distel

[11] 3,882,603
[45] May 13, 1975

[54] SELF-CONTAINED NAVIGATION DEVICE
[76] Inventor: Maurice Distel, 38 Wyckham Rd., New Shrewsbury, N.J. 07724
[22] Filed: Aug. 2, 1974
[21] Appl. No.: 494,023

[52] U.S. Cl. ................................. 33/79 A; 353/12
[51] Int. Cl. ....................... G03b 21/00; B43l 13/02
[58] Field of Search ............................. 353/11–14, 353/44; 33/76 R, 76 V, 79 R, 79 A, 79 B, 79 C, 79 D, 78, 1 AA

[56] References Cited
UNITED STATES PATENTS
1,462,100  7/1923  Caproni ............................ 33/1 AA
2,364,149  12/1944  Kent .................................. 33/79 R
2,423,513  7/1947  Meyer ................................ 353/12

Primary Examiner—Harry N. Haroian
Attorney, Agent, or Firm—Charles F. Gunderson

[57] ABSTRACT

A microfilm reader that has a special microfilm positioning assembly is adapted to project a portion of a microfilmed navigation chart on a rear projection screen, which may be gridded. A transparent overlay may be provided to serve as a plotting surface. This overlay also may be gridded. A parallel linkage mechanism has one end secured to the microfilm reader and another end, including a protractor, free to move over the surface of the rear projection screen. The central portion of an offset arm is slidably and pivotably mounted on the center of the protractor. A primary course bearing arm and a secondary course bearing arm are pivotably mounted on one end of the offset arm. Movement of these arms and the microfilm positioning assembly with respect to a reference point, or grid line, can establish the latitude and the longitude of any point on the chart; the true and the corrected azimuth for any course plotted on the chart, with respect to the chart compass rose; as well as the position of a ship from azimuth bearings of known points on the chart.

9 Claims, 3 Drawing Figures 3,882,603

SELF-CONTAINED NAVIGATION DEVICE

BACKGROUND OF THE INVENTION

Navigation, particularly of small ocean-going vessels, usually requires special charts that show land marks, shore obstructions, and the like, as well as compass directions. A course to be navigated is laid out on such a chart and is related to the azimuth direction on a compass rose on the chart by means of course plotters and parallel rules. Leeway corrections, tide and wind corrections; latitude and longitude readings; triangulation position findings, etc. must all be performed by a series of relatively complicated steps involving the above and other navigating instruments.

These special navigational charts usually include considerably detail for navigation in and around harbors, or in the vicinity of obstructions. The charts are, therefore, quite bulky and difficult to use and store in the cramped spaced allowed for this purpose in a small ocean-going vessel. These charts are also affected by weather, handling, and actual use. They may become torn, bent, distorted, or even illegible at a critical moment. The several navigational aids and instruments required to complete the plotting of the course are delicate and must be carefully handled. They take up additional space and must be kept readily available for effective navigation.

Pictorial plotting devices that avoid the use of bulky charts, as such, including PPI radar devices or map-portion projecting devices, are also known and are of particular value for the rapid, usually visual type of data needed in aircraft guidance. However, these devices are primarily concerned with showing—continuously—the relationship between an aircraft and ground. Their screens sometimes include azimuth marking or grids, to indicate direction of flight or relative distances, but they cannot, readily, be used for future course plotting and the various course correction necessary for the safe navigation of a ship. The aircraft is, of course, not concerned with channels, harbors, and the myriad hazards of boat navigation since it is flying over them. Therefore, none of these pictorial plotting devices needs to present as much of this detail. Nor need these devices include future course plotting facilities or mechanism or facilities for finding position by triangulation. In addition, most of these devices usually require intricate electronic circuitry; they are complex, expensive, and unsuited for small craft in general.

SUMMARY OF THE INVENTION

These and other problems of conventional navigation devices and systems are overcome by this invention in which a combination of special plotting arms, mounted on a parallel linkage mechanism is combined with a rear projection screen that is part of a microfilm reader. The microfilm reader includes a card holder that is free to move in — or can be locked in — either of two orthogonal directions. A microfilm copy of a chart covering the area to be navigated is placed in the card holder, which aligns it in accordance with the orthogonal directions, and a portion of the chart that includes the actual course to be plotted is projected on the rear projection screen. To cover almost all exigencies of course plotting, the combination of special plotting arms includes an offset arm that is slidable and rotatable about a protractor on one end of the parallel-linkage mechanism, and a primary course bearing arm and a secondary course bearing arm that are both pivotably attached to one end of the offset arm. Locks are provided on the pivot between the protractor and the offset arm and on the pivot between the offset arm and the primary and secondary bearing arms. A transparent overlay, that may be gridded, may be positioned between the front of the screen and the special plotting arms, with appropriate pencils to mark courses or reference points.

The primary bearing arm may be set along the course to be plotted and locked in that azimuth. Then, either the parallel-linkage mechanism may be moved to position the primary bearing arm on the portion of the projected map that contains the compass rose, or the microfilm can be moved, by moving the card holder, until the compass rose is under the primary bearing arm. The direction of the course to be navigated is then established from the compass markings.

The offset arm is, basically, used to set the direction and speed of the tide. The primary bearing arm is then used to set the speed of the ship along the course to be sailed to obtain the corrected course bearing in the well known manner of vector addition. The secondary bearing arm may be used to accommodate a known angle of leeway or drift that will be uniform along the course to be sailed. The final course heading may be taken from the secondary bearing arm and the compass rose, as described above, for maximum accuracy and precision.

DESCRIPTION OF THE PREFERRED EMBODIMENT

Figure 1:
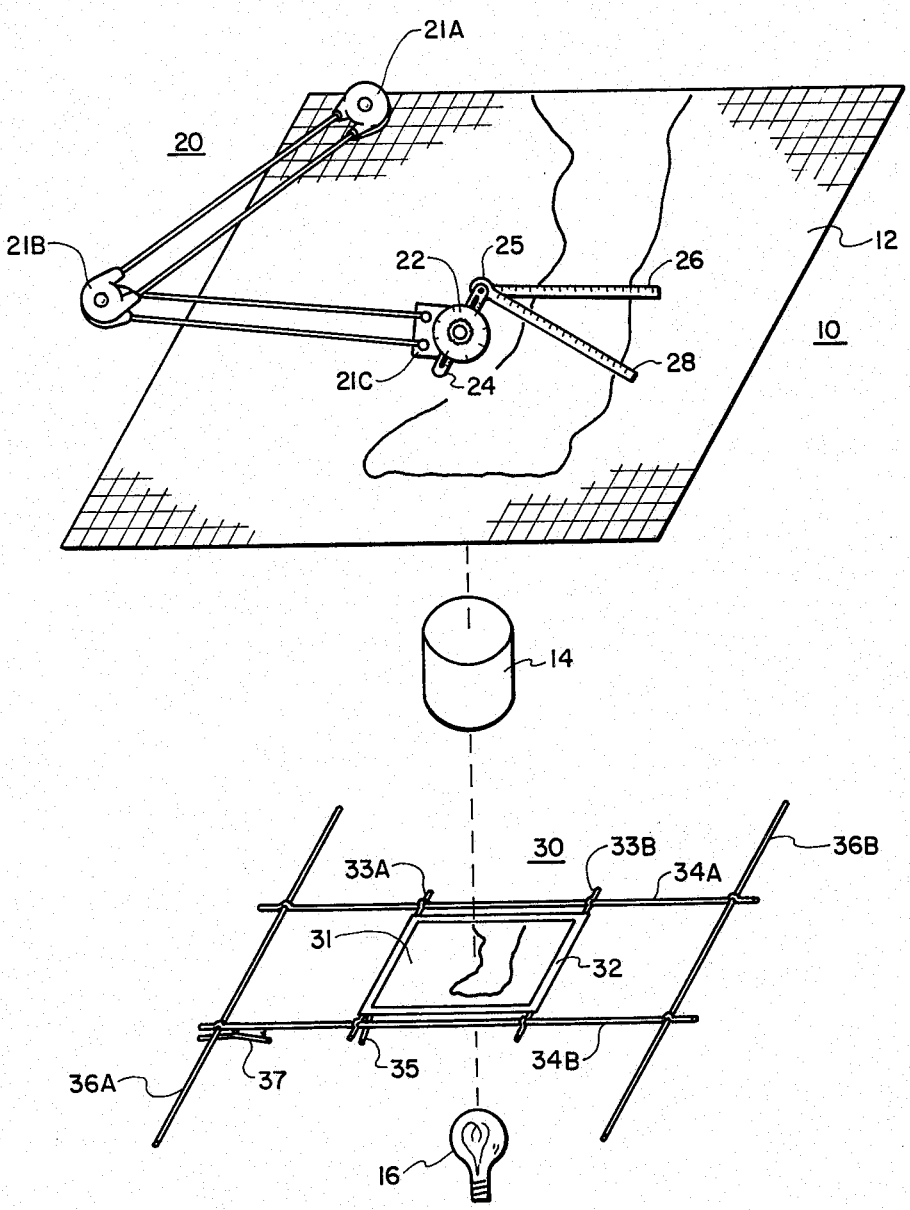
FIG. 1 shows a general view of the microfilm reader with the parallel-linkage mechanism and the special plotting arms.

Referring now more particularly to FIG. 1, a microfilm reader 10 has a rear projection screen 12, a lens system 14, a microfilm positioning assembly 30, and a light source 16. A parallel-linkage mechanism 20 has one end 21A that is fixed with respect to the rear projecting screen. The linkage mechanism passes through a coupling point 21B, in a well known manner, to another end 21C that is terminated in a protractor 22 that is movable with respect to the screen. An offset arm 24 is slidably and pivotably mounted on the center of the protractor 22 and has one end 25 pivotally coupled to a primary bearing arm 26 and a secondary bearing arm 28. These special plotting arms will be described and illustrated in more detail along with FIG. 2.

The microfilm positioning assembly 30 has a card holder 32 for a microfilm card 31. The card holder 32 is mounted on sliders 33A and 33B that can slide in one orthogonal direction on rails 34A and 34B, which, in turn, can slide on rails 36A and 36B in the other orthogonal direction. A locking device 35 is provided in the one orthogonal direction and a locking device 37 is provided in the other orthogonal direction. This microfilm positioning assembly will be described and illustrated in more detail along with FIG. 3.

Figure 2:
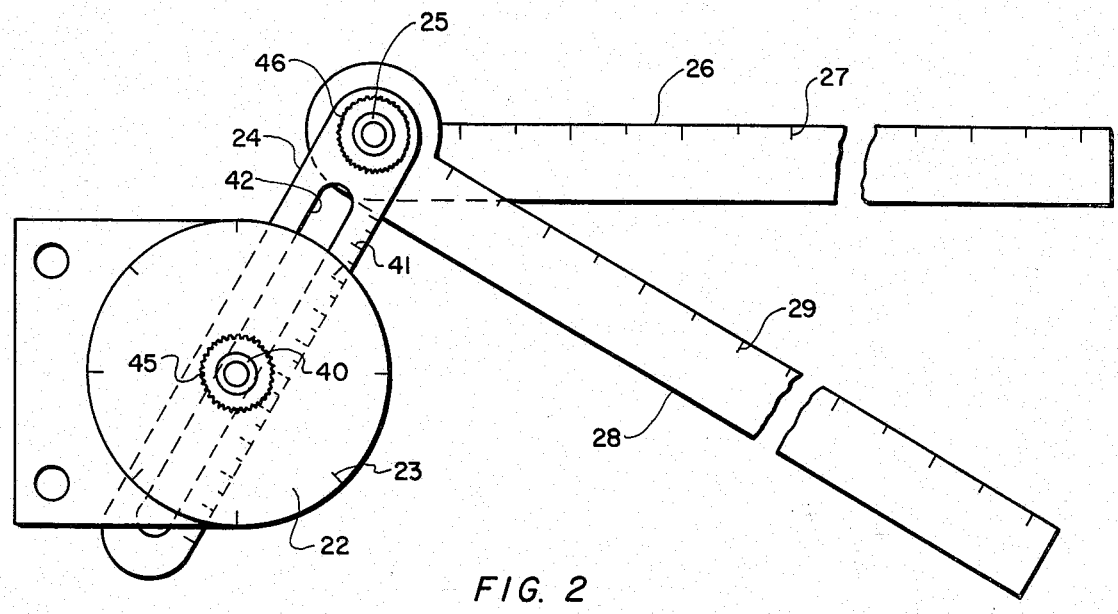
FIG. 2 shows a detail of the special plotting arms.

Referring now more particularly to FIG. 2, the details of the special plotting arms are shown in a more enlarged size to better illustrate the scales and the mechanical interrelation of the arms. The same elements in FIGS. 1 and 2 have the same numbers. The protractor 22 has a scale 23 and a central pivot 40. The offset arm 24 has a slidable and pivotable relationship with the protractor 23 through an elongated slot 42 that is movable with respect to the central pivot 40. A knurled nut 45 is provided to control the friction of the pivot 40, or to lock the offset arm with respect to the protractor. The offset arm has a scale 41.

One extremity of the offset arm has a pivot 25. A primary course bearing arm 26 and a secondary course bearing arm 28 is pivotably coupled to the pivot 25 of the offset arm. A knurled nut 46 is provided to control the friction of the pivot 25, or to lock the bearing arms in any desired position with respect to the offset arm. Scales 27 and 29 are provided on the primary and secondary bearing arms respectively.

Figure 3:
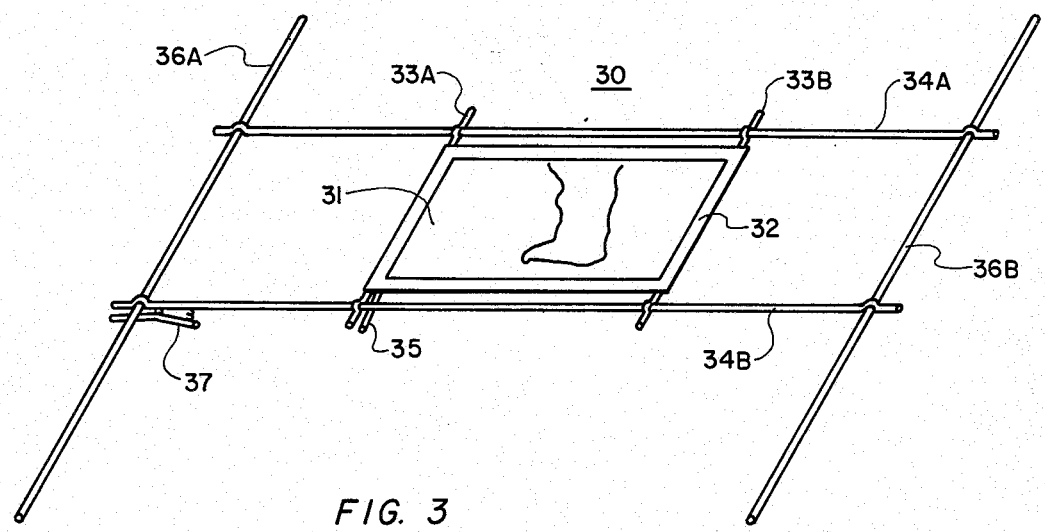
FIG. 3 shows a microfilm positioning assembly adapted for use in this invention.

Referring more particularly to FIG. 3, the microfilm positioning assembly 30 is shown in more detail and in a larger scale. The same elements in FIGS. 1 and 3 have the same numbers. FIG. 3 shows more clearly a microfilm card 31 positioned in a card holder 32 which is mounted on slides 33A and 33B that can move freely, or be locked, in one orthogonal direction, along rails 34A and 34B. A locking device 35 is provided to secure the card holder in any desired position in this orthogonal direction.

The rails 34A and 34B, in turn, also functional as slides, that can move freely, or be locked in the other orthogonal direction, in the same manner, along rails 36A and 36B. A locking device 37 is provided to secure the card holder in any desired position in this orthogonal direction.

In operation, the microfilm card 31 is positioned in the card holder 32 and moved until the portion of the chart that includes the course to be plotted is visible on the rear projection screen. In the simplest case, referring to all the figures, the parallel-linkage mechanism can be moved and the primary bearing arm 26 can be rotated until the scale 27 of the primary course bearing arm 26 extends between any two desired points on the course to be plotted. The special plotting arms are fastened in this position. The card holder is then moved until the nearest compass rose on the chart is centered under the fixed primary bearing arm. The compass bearing of the course to be navigated in then read. The card holder is then restored to the original position, and the distance between any two desired points on the course can be read from the scale 27 on the primary bearing arm.

As noted before, transparent films can be used as overlays on the front of the rear projection screen, and suitable marking pencils can be used to lay out courses to be plotted for future reference. Such overlays must, of course, be calibrated with respect to latitude and longitude, or with respect to known land marks on the chart, to insure that the chart projection can be returned to the original position under the overlays.

If the tides are known, the offset arm is used to set the azimuth of the tide, on the protractor scale 23, and to set the speed of the tide current on the offset scale 41, then the locking nut 45 on the pivot 40 is tightened. The center 40 of the protractor 22 is set on the starting point of the course and the speed of the vessel is read along the primary bearing arm scale 27. The primary bearing arm is rotated to have this speed-of-the-vessel reading intersect a line between the starting and the finishing points along the course line. This may already be marked on an overlay. This establishes the angle of drift due to tide. The locking nut 46 on the pivot 25 is tightened in this position and the compass rose is used, along with the primary bearing arm, as before, to determine the course bearing as corrected for the tide.

The secondary bearing arum may be used to compensate for leeway or other drift factors of a given boat under given conditions. In this case, the known drift angle is set on the secondary bearing arm after the tide correction has been plotted on the primary bearing arm. This secondary bearing arm then can be referred to the compass rose, as before, to establish the final, corrected heading to be sailed to maintain a given course.

In still another situation, in plotting the position of a boat already on course, the primary and secondary bearing arms are set, on the compass rose, to two separate azimuths, or bearings, from visual readings or from radio direction finder headings or the like. The card holder or the microfilm positioning assembly is then set to project the portion of the chart that includes the two land marks, or radio transmitter tower positions; and either the parallel-linkage mechanism or the card holder is adjusted to position the primary and secondary bearing arms to intersect the two land marks; whereat the pivot 25 determines the position of the boat.

One of the important features of this device is its ability to read true latitude and longitude of any given point quickly and accurately. For this purpose, locks 35 and 37 are provided on each of the two orthogonal directions of the microfilm positioning assembly. By this means, for example, if the latitude of a given point is to be read, the chart is positioned until the point in question coincides with the nearest convenient horizontal grid overlay line, or any other mark on the overlay. The longitude directional rail slides 34 can be locked along rails 36 by means of lock 37 and the card holder moved along the latitude coordinate rails 34 until the latitude scale on the edge of the chart is intersected by this grid line or mark. Similarly, if the longitude of the given point is to be read, the latitude directional slides 33 can be locked by means of lock 35 and the card holder moved along the longitude coordinate rails 36 until the longitude scale on the edge of the chart is intersected by the vertical reference grid line.

For this purpose, not only the locking mechanism for one or both of the directions of motion can be provided, but detent mechanisms, of well-known types, can be included to provide a means for restoring the card holder to a precise starting point, to resume course plotting, after referring to a latitude or longitude scale or to the compass rose. A positioning index may also be used to return the card to a given position.

The pivots 25 and 40 of the special plotting arms would preferrably be grommets with knurled nuts 45 and 46, respectively, to control the friction of the offset arm and the bearing arm. The grommets should be hollow for marking or sighting a specific point on the chart at the exact center of the pivot. The protractor, special plotting arms, and other elements may be transparent for maximum visibility.

The offset arm and the slot 42 should be long enough to accommodate the maximum speed of the tides under normal conditions. When tide corrections are to be made, the scale 41 would be in nautical miles. When no tide corrections need be made, the offset arm serves to position the bearing arms away from the protractor and parallel-linkage mechanism for better visibility and more accurate plotting.

The bearing arms should be long enough to cover the normal course or the segment of the course that it is desired to navigate. The bearing arms should each have at least one scale, such as 27 or 29, which should be in nautical miles to correspond with the scale 41 of the offset arm. Other scales may be inscribed on any of the special plotting arms to accommodate other map scales or situations.

While the scale 23 of the protractor 22 could be calibrated fairly accurately in magnetic or true azimuth and the bearing arms could be extended from the offset arm to use this scale to read bearings, it is desirable, for greatest accuracy, to refer a primary bearing arm to a compass rose of the actual chart for the precise bearing of the course to be sailed.

The chart, reduced to a portion of a microfilm card or microfiche or other mounting, will presumably, be positioned correctly and consistently in its card holder. However, minute variations in the orientation of the card or card holder could introduce variations in the azimuth of the grids of the projected image. This is particularly significant when a fixed grid overlay is provided on the front of the screen. However, it is obvious that a mechanism can be provided so that minor rotational adjustments can be made within the card holder to orient the grid lines of the chart with any other grid lines on the screen, or an overlay, or with the normal position of the rear projection screen.

One of the advantages of a navigating device such as this is the ability to provide a means for including and projecting not only the charts that will be pertinent to a given area for a given cruise but also pictures of land marks or other identifying features that will help the navigator to recognize a harbor entrance or other land fall as it comes into view. Local current or tide charts, as well as the latest chart corrections and warnings to navigators can also be microfilmed. These can all be assembled on a few very compact, rugged cards to cover almost any given navigating situation. The use of color on the microfilms of the charts and other displays will obviously enhance the effectiveness of this device.

Microfilm readers or viewers are well known and are available from many sources. Some of the commercially available models can be modified for this purpose. A compact, portable unit would obviously be preferable, but any microfilm reader would probably have to be strengthened and waterproofed for shipboard use.

Several individual microfilms are usually assembled into a microfiche or mounted in one of the available film holders, or acetate jackets to provide a microfilm card of uniform size and shape. These may provide a considerable amount of information is a given unit. These units should be large enough to be handled conveniently and contain the desired information, yet small enough to be carried safely and stored.

A microfilm viewer techniques that would also be applicable to this navigating system, includes reader-printers that can copy anything that is projected on the screen. These printers could obviously be used to record a given course and its corrections as soon as it has been plotted on the device, although it will presently not render color.

The problems of illuminating the rear projection screen, projecting an image, and viewing it, are well known, as are the solutions to those problems. A stronger light source, or a larger aperture optical system, will brighten the projected image, and a fresnel screen, and/or suitable shield against ambient light will give the reader a clearer view of the screen.

Parallel-linkage mechanisms are also well known, and are widely used on mechanical drawing boards. This type of linkage mechanism is used to maintain the parallel relationship between the protractor, the special plotting arms, the rear projection screen, and an overlay, when used for measurement and plotting.

While the offset arm and primary bearing arm are, at least, essential for plotting a course involving tide corrections, and the secondary arm is necessary for plotting certain additional corrections, and for triangulation, it is obvious that additional arms can be provided for additional functions. For example, an additional arm could be provided, extending directly from the protractor, rotatably mounted on the pivot 40, to indicate the true course while the tide and other corrections are being plotted on the other special plotting arms.

While it is intended, basically, to provide microfilms pf standard charts that can be enlarged to normal size so that at least a portion of the chart can be viewed on the rear projection screen, it is obvious that lesser magnifications may be provided to cover larger areas of a given chart for plotting an overall course, or for triangulation of larger areas. Conversely, greater magnifications may be provided to cover smaller areas of a given chart where critical conditions may be encountered. This change in magnification is well within the state or the art and the capabilities of this device. The magnification of the microfilm reader can, in fact, be made variable to adjust the grid of the chart to the grid of an overlay, or to the calibration of the primary bearing arm.

It is to be understood that I do not desire to be limited to the exact details of construction shown and described, for obvious modifications will occur to a person skilled in the art.

What is claimed is:

1. A navigation device for use with a microfilm reader having a rear projection screen, said microfilm reader having movable means for mounting and projecting a portion of a mcirofilmed map on said rear projection screen; said navigation device comprising a parallel-linkage mechanism having one end rigid and an other end free to move with respect to said rear projection screen; a combination of special plotting arms including at least an offset arm, a primary course bearing arm, and a secondary course bearing arm; means for slidably and rotatably securing the center portion of said offset arm to said other end of said parallel-linkage mechanism; means for rotatably securing one end of said primary course bearing arm to one end of said offset arm; means for rotatably securing one end of said secondary course bearing arm to said one end of said offset arm.

2. In combination with a navigation device as in claim 1 a transparent overlay, positioned between said rear projection screen and said combination of special plotting arms; and means for marking course data on said transparent overlay.

3. A navigation device as in claim 1 wherein said means for slidably and rotatably securing said center portion of said offset arm to said other end of said parallel-linkage mechanism comprises a protractor.

4. A navigation device as in claim 1 wherein said means for slidably and rotatably securing said center portion of said offset arm to said other end of said parallel-linkage mechanism includes a hollow, knurled nut to control the friction of the elements and provide visibility and marking access at the pivot point.

5. A navigation device as in claim 1 wherein said means for rotatably securing said primary and said secondary course bearing arms to said one end of said offset arm includes a hollow, knurled nut to control the friction of said arms with respect to each other and provide visibility and marking access at the pivot point.

6. A navigation device as in claim 1 wherein said movable means for mounting and projecting a portion of a microfilmed map on said rear projection screen comprises a microfilm car holder; means for moving said card holder in one orthogonal direction; means for locking the motion of said card holder in said one orthogonal direction; means for moving said card holder in the other orthogonal direction; and means for locking the motion of said card holder in said other orthogonal direction.

7. In combination with a navigation device as in claim 6, a microfilmed map, mounted in said card holder, having parallels of latitude along said one orthogonal direction and meridians of longitude along side other orthogonal direction.

8. A navigation device as in claim 1 wherein said offset arm, said primary course bearing arm, and said secondary course bearing arm are all marked with a reference scale to read distance on said map projection on said rear projection screen.

9. A navigation device as in claim 1 wherein said microfilm reader includes an optical system of variable magnification to adjust the scale of said map projection of said rear projection screen.

* * * * *